(12) United States Patent
Uchiyama (10) Patent No.: US 7,843,674 B2
(45) Date of Patent: Nov. 30, 2010

(54) MOTOR DRIVE CIRCUIT

(75) Inventor: Yuji Uchiyama, Ota (JP)

(73) Assignees: Sanyo Electric Co., Ltd., Osaka (JP);
Sanyo Semiconductor Co., Ltd.,
Ora-gun, Gunma (JP)

( * ) Notice: Subject to any disclaimer, the term of this patent is extended or adjusted under 35 U.S.C. 154(b) by 234 days.

(21) Appl. No.: 12/323,082

(22) Filed: Nov. 25, 2008

(65) Prior Publication Data
US 2009/0200973 A1  Aug. 13, 2009

(30) Foreign Application Priority Data
Nov. 29, 2007  (JP)  ............................. 2007-309264

(51) Int. Cl.
*H02H 3/00* (2006.01)
(52) U.S. Cl. .............................. 361/89; 361/29; 361/28; 361/23; 361/54; 361/78; 361/79; 361/88; 361/91.3; 361/31; 361/87; 361/94; 361/212; 318/432; 318/434; 318/801; 318/400.29; 323/274; 323/276; 323/275; 323/282; 323/284; 327/261; 327/392; 320/137; 320/166; 700/293
(58) Field of Classification Search ................... 361/29, 361/28, 23, 54, 78, 79, 88, 89, 91.3, 31, 87, 361/94, 212; 318/434, 400.29, 801, 432; 320/137, 166; 700/293; 340/664; 323/274, 323/276, 275, 282, 284; 327/261, 392
See application file for complete search history.

(56) References Cited

U.S. PATENT DOCUMENTS 5,444,595 A * 8/1995 Ishikawa et al. .............. 361/86
5,574,320 A * 11/1996 Shirai et al. ................. 307/131
5,710,508 A * 1/1998 Watanabe .................... 323/284
6,288,883 B1 * 9/2001 Chen ............................ 361/58
6,717,785 B2 * 4/2004 Fukuda et al. ............. 361/93.1
6,842,064 B2 * 1/2005 Yamamoto .................. 327/480
7,215,180 B2 * 5/2007 Nagata et al. ............... 327/538
7,345,383 B2 * 3/2008 Zushi et al. ................. 307/130

FOREIGN PATENT DOCUMENTS

JP        05-111144        4/1993

* cited by examiner

*Primary Examiner*—Rita Leykin
(74) *Attorney, Agent, or Firm*—SoCal IP Law Group LLP; Steven C. Sereboff; John E. Gunther (57) ABSTRACT

A motor-drive circuit comprising: a current-passage-control circuit to perform ON/OFF control of a drive transistor connected to a motor coil to pass current through the motor coil; an overcurrent-state-detection circuit to detect whether current passing through the drive transistor is in an overcurrent state where the current exceeds a predetermined threshold value; a charging and discharging circuit to start charging a capacitor in response to detecting the overcurrent state by the overcurrent-state-detection circuit and subsequently discharge the capacitor in response to not detecting the overcurrent state; and an overcurrent-protection-control circuit to stop the ON/OFF control to turn off the drive transistor, for an elapsed charging period for a charging voltage of the capacitor at a predetermined voltage to exceed a threshold voltage, and determine whether to perform such an overcurrent-protection-control as to turn off the drive transistor by detection of the overcurrent state, after the charging period has elapsed.

5 Claims, 6 Drawing Sheets

MOTOR DRIVE CIRCUIT

CROSS-REFERENCE TO RELATED APPLICATION

This application claims the benefit of priority to Japanese Patent Application No. 2007-309264, filed Nov. 29, 2007, of which full contents are incorporated herein by reference.

BACKGROUND OF THE INVENTION

1. Field of the Invention

The present invention relates to a motor drive circuit.

2. Description of the Related Art

A motor drive circuit normally includes an overcurrent protection circuit that protects the motor drive circuit from an overcurrent state caused by an accidental short circuit (source short, ground short, load short, etc.). Hereinafter, a motor drive circuit 10 including an overcurrent protection circuit will be described with reference to FIG. 5.

Figure 5:
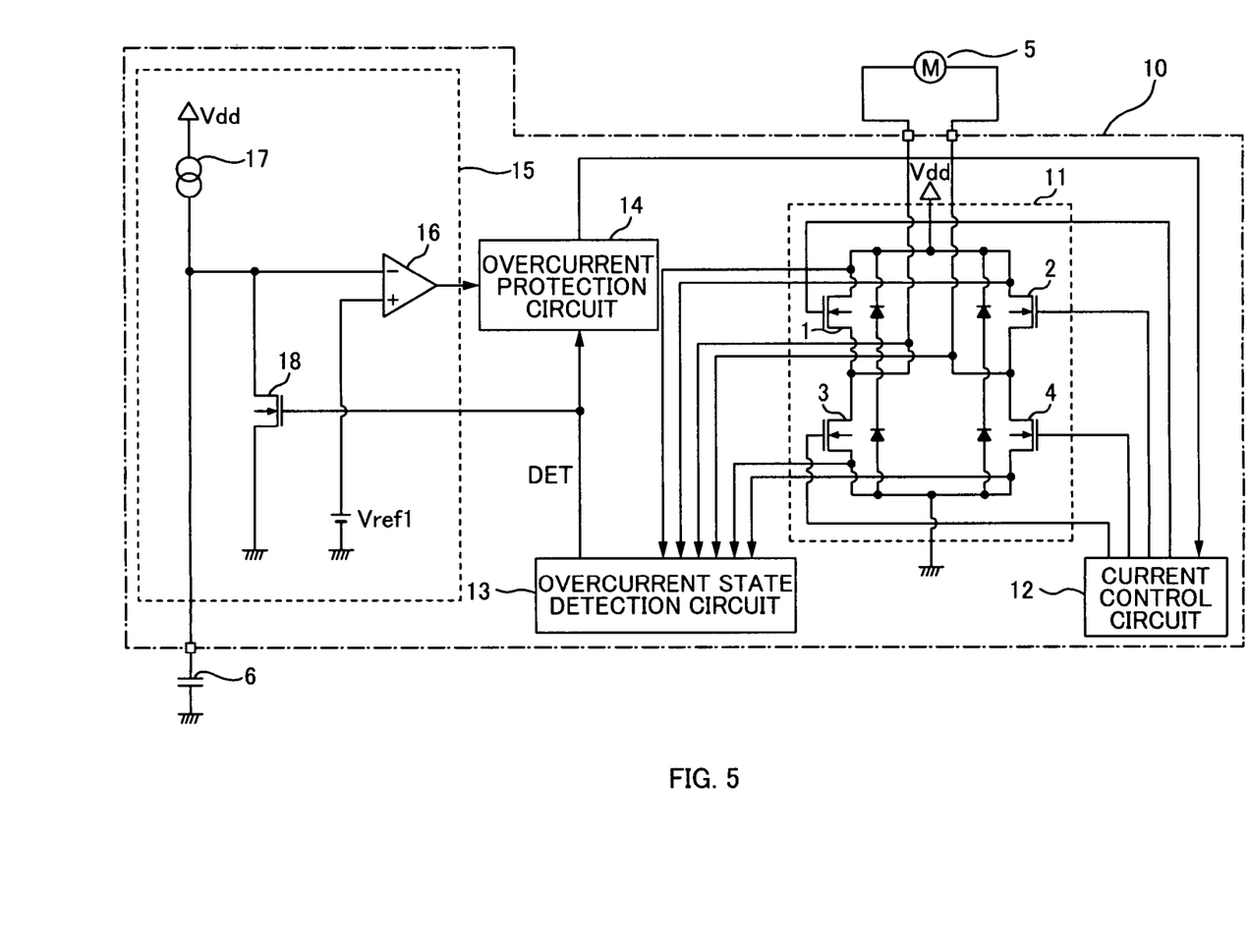
FIG. 5 illustrates a configuration of a motor drive circuit.

The motor drive circuit 10 has a configuration enclosed by alternate long and short dashed lines illustrated in FIG. 5. Specifically, the motor drive circuit 10 includes an H bridge circuit 11, a current passage control circuit 12, an overcurrent state detection circuit 13, an overcurrent protection circuit 14, and a mask period setting circuit 15; and the motor drive circuit 10 is externally connected to a motor coil 5 and a capacitor 6.

In the H bridge circuit 11, source transistors 1 and 2 on a power supply Vdd side and sink transistors 3 and 4 (for example, n-channel MOSFETs) on a grounding side are bridge-connected via the motor coil 5.

The current passage control circuit 12 controls the H bridge circuit 11 such that a pair of the source transistor 1 and the sink transistor 4 and a pair of the source transistor 2 and the sink transistor 3 are complimentarily switched ON and OFF. As a result, the direction of the drive current passed through the motor coil 5 is changed, so that the motor is driven to be rotated.

When the overcurrent state detection circuit 13 detects an overcurrent state in which current being passed through the transistors 1 to 4 exceeds a predetermined threshold value due to an external factor, the overcurrent state detection circuit 13 outputs an overcurrent state detection signal DET of a logic level (hereinafter referred to as "L level") indicating the above. An overcurrent state occurs due to an external factor in a case where 1) each of the source transistors 1 and 2 on the source side is short-circuited to ground when the source transistors 1 and 2 are ON, and in a case where 2) each of the sink transistors 3 and 4 on the drain side is short-circuited to the power supply Vdd when the sink transistors 3 and 4 are ON.

When the overcurrent protection circuit 14 receives an L level overcurrent state detection signal DET indicating detection of an overcurrent state from the overcurrent state detection circuit 13, the overcurrent protection circuit 14 performs an overcurrent protection control to turn off all of the transistors 1 to 4 making up the H bridge circuit 11, as a general rule. However, there is a risk that the overcurrent state may be erroneously detected due to unexpected noise (a spike noise, etc.) superimposed on the drive current. Therefore, the overcurrent protection circuit 14 includes a configuration in which the overcurrent protection control of turning off all of the transistors 1 to 4 is temporarily prohibited during a time period from the time when the overcurrent state is detected by the overcurrent state detection circuit 13 until time the when a mask period has elapsed which is set as a charging period in the mask period setting circuit 15.

An external capacitor 6, which is easily attached and removed, is mainly used so that the mask period can be flexibly set according to circumstances of use of the motor drive circuit 10. Specifically, the mask period setting circuit 15 includes a comparator 16, a constant current source 17, and a discharge transistor 18 (for example, an n-channel MOSFET), and sets, as the mask period, a period during which a charging voltage of the capacitor 6 is increased from a predetermined voltage (0 level in a state where no charge is accumulated, or an initial level according to a charge in a state where the charge is accumulated) to reach a reference voltage Vref1.

Specifically, the discharge transistor 18 is turned off in response to the L level overcurrent state detection signal DET indicating detection of the overcurrent state, and the constant current source 17 starts charging the capacitor 6. When the charging voltage of the capacitor 6 reaches the reference voltage Vref1 from the predetermined voltage, the mask period has elapsed, and an output of the comparator 16 changes from H level to L level. Therefore, the overcurrent protection circuit 14 determines whether or not to perform an overcurrent protection control of turning off all of the transistors 1 to 4 based on the output logic level of the comparator 16.

Figure 6:
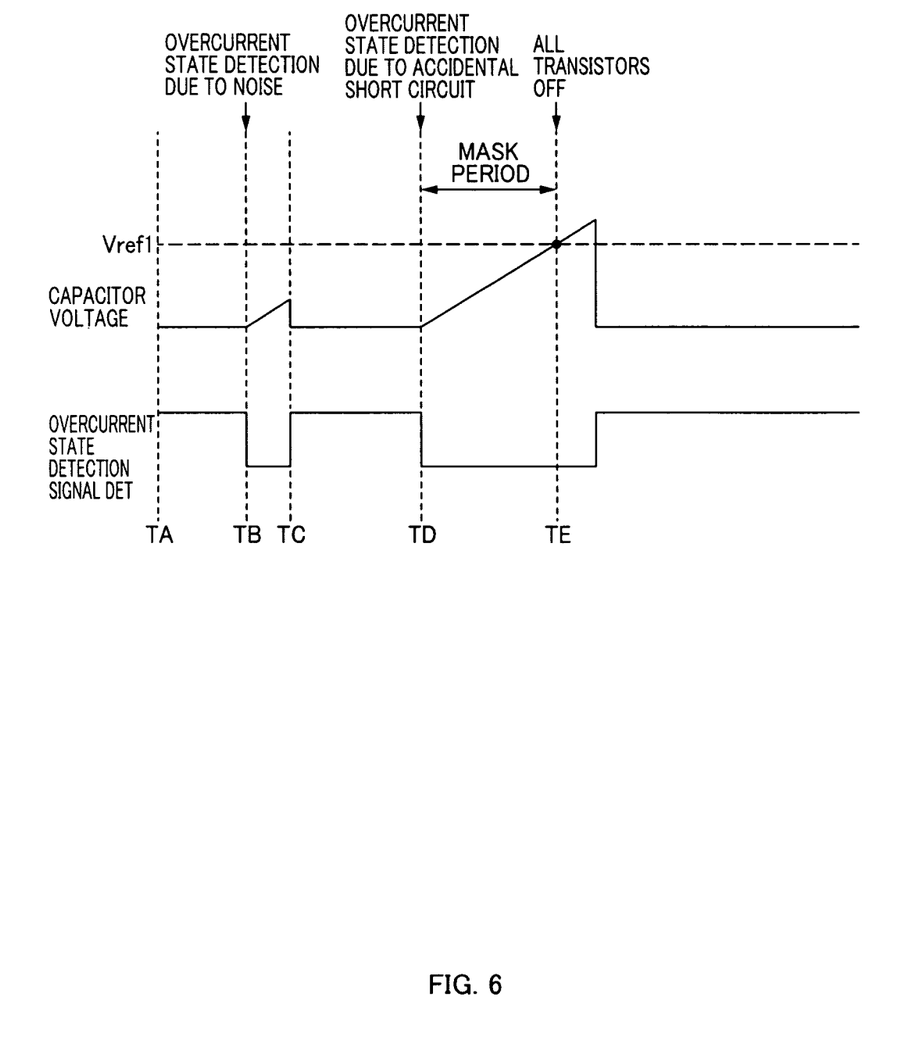
FIG. 6 is a waveform diagram of main signals of a motor drive circuit.

Hereinafter, operations of the motor drive circuit 10 will be described based on a waveform diagram of main signals of the motor drive circuit 10 illustrated in FIG. 6.

First, at time TA, a case is assumed where the overcurrent state detection circuit 13 does not detect an overcurrent state and outputs an H level overcurrent state detection signal DET. In this case, complimentary ON/OFF control is performed by the current passage control circuit 12 for the transistors 1 to 4 making up the H bridge circuit 11 for driving the motor to be rotated. Also in this case, the discharge transistor 18 is ON due to the H level overcurrent state detection signal DET, and therefore, the capacitor 6 is in a state of not being charged.

Next, at time TB, a case is assumed where the overcurrent state caused by unexpected noise is detected by the overcurrent state detection circuit 13, and the L level overcurrent state detection signal DET is output. In this case, the discharge transistor 18 is turned off due to the L level overcurrent state detection signal DET, and therefore, the capacitor 6 starts being charged. At the time TB, the complimentary ON/OFF control for driving the motor to be rotated is performed as usual (in a state where the overcurrent state does not occur) for the transistors 1 to 4 by the current passage control circuit 12.

Next, at a time TC, a case is assumed where the overcurrent state detection circuit 13 determines that the overcurrent state is no longer detected since the overcurrent state detected at the time TB is caused by the unexpected noise, and outputs the H level overcurrent state detection signal DET. In this case, the discharge transistor 18 is turned on due to the H level overcurrent state detection signal DET, and therefore, the capacitor 6, which has continuously been charged from the time TB, is discharged.

During a period from the time TB to the time TC, the capacitor 6 is charged, but the charging voltage of the capacitor 6 does not reached the reference voltage Vref1, and the mask period of the mask period setting circuit 15 has not elapsed since the detection of the overcurrent state. In other words, the overcurrent protection circuit 14 determines that the overcurrent state detected during the period from the time TB to the time TC is caused by noise, and temporarily prohibits the overcurrent protection control of turning off all of the transistors 1 to 4.

Next, at a time TD, a case is assumed where the overcurrent state detection circuit 13 detects the overcurrent state caused not by noise but by an accidental short circuit, and outputs the L level overcurrent state detection signal DET. In this case, the discharge transistor 18 is turned off due to the L level overcurrent state detection signal DET, and therefore, the capacitor 6 starts being charged again. Also, a complimentary ON/OFF operation for driving the motor to be rotated is performed for the transistors 1 to 4 by the current passage control circuit 12.

Further, at a time TE, the charging voltage of the capacitor 6 reaches the reference voltage Vref1; and the mask period set by the mask period setting circuit 15 has elapsed since the detection of the overcurrent state at the time TD. Upon the elapse of the mask period, the overcurrent protection circuit 14 stops the ON/OFF control by the current passage control circuit 12 to perform the overcurrent protection control of turning off all of the transistors 1 to 4. (Japanese Patent Laid-Open Publication No. H5-111144)

As described above, the motor drive circuit including an overcurrent protection circuit has a configuration where the overcurrent protection control of turning off all of the drive transistors is temporarily prohibited during the period from the time when the overcurrent state is detected until the time when the mask period to be set as a charging period of the capacitor is elapsed assuming that the overcurrent state due to noise is an erroneously detected, and where the ON/OFF control is continued of the drive transistors for driving the motor to be rotated.

However, when having such a configuration, the overcurrent protection control is temporarily prohibited during the mask period, even though the overcurrent state is detected which is caused not by noise but by the accidental short circuit. Therefore, when the mask period is set improperly long, there is a risk of a failure of an object to be protected from overcurrent (a motor coil, a drive transistor, etc.)

A capacitor varies in capacitance, and variation in the capacitance occurs which is caused by environmental conditions such as temperature. Moreover, the failure conditions of the object to be protected from the overcurrent also vary with the applied voltage, supplied current, surrounding temperature, etc. Therefore, it is difficult to appropriately set the length of the mask period as the charging period of the capacitor to reduce erroneous detections of the overcurrent state caused by noise.

SUMMARY OF THE INVENTION

A motor drive circuit according to an aspect of the present invention, comprises: a current passage control circuit configured to perform ON/OFF control of a drive transistor connected to a motor coil to pass current through the motor coil; an overcurrent state detection circuit configured to detect whether or not current passing through the drive transistor is in an overcurrent state where the current exceeds a predetermined threshold value; a charging and discharging circuit configured to start charging a capacitor in response to detecting the overcurrent state by the overcurrent state detection circuit and subsequently discharge the capacitor in response to not detecting the overcurrent state; and an overcurrent protection control circuit configured to stop the ON/OFF control of the drive transistor performed by the current passage control circuit to turn off the drive transistor, for an elapsed charging period for a charging voltage of the capacitor at a predetermined voltage to exceed a threshold voltage, and determine whether or not to perform such an overcurrent protection control as to turn off the drive transistor by detection of the overcurrent state, after the charging period has elapsed.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

<<<Configuration of Motor Drive Circuit>>>

Figure 1:
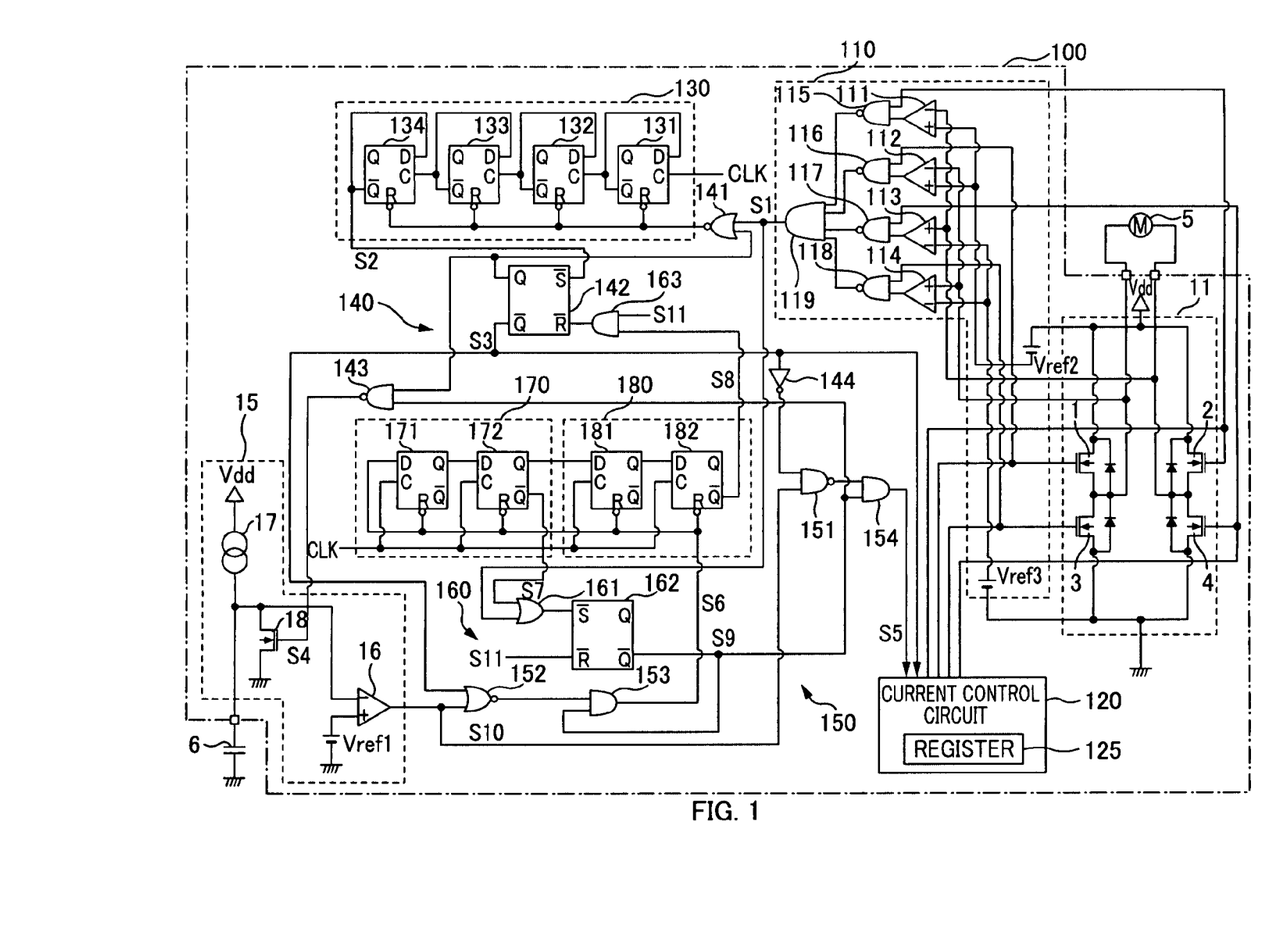
FIG. 1 illustrates a configuration of a motor drive circuit according to an embodiment of the present invention.

FIG. 1 is a block diagram illustrating a motor drive circuit according to an embodiment of the present invention. Constituents illustrated in FIG. 1 that are identical to those of the configuration illustrated in FIG. 5 are given the same reference numerals, and descriptions thereof are omitted. Also, a case is assumed where a configuration enclosed by alternate long and short dashed lines illustrated in FIG. 1 is a motor drive circuit 100 integrated into one chip, and a motor coil 5 and a capacitor 6 are externally connected to the motor drive circuit 100.

The motor drive circuit 100 includes an H bridge circuit 11, an overcurrent state detection circuit 110, a current passage control circuit 120, a first monitor circuit 130, a first control circuit 140, an overcurrent protection circuit 150, and a mask period setting circuit 15. Further, the motor drive circuit 100 includes a second control circuit 160, a second monitor circuit 170, and a third monitor circuit 180. The overcurrent protection circuit 150, the first control circuit 140, and the second control circuit 160 correspond to the overcurrent protection control circuit.

When the overcurrent state detection circuit 110 detects an overcurrent state in which current being passed through transistors 1 to 4 exceeds a predetermined threshold value due to an external factor, the overcurrent state detection circuit 110 outputs a signal S1 of a logic level indicating the above. Hereinafter, an H level signal S1 represents that the overcurrent state is not detected, and an L level signal S1 represents that the overcurrent state is detected. The overcurrent state occurs due to an external factor in a case where 1) each of the source transistors 1 and 2 on the source side is short-circuited to ground when the source transistors 1 and 2 are ON, and in a case where 2) each of the sink transistors 3 and 4 on the drain side is short-circuited to a power supply Vdd when the sink transistors 3 and 4 are ON.

The overcurrent state detection circuit 110 includes four comparators 111 to 114, four NAND gates 115 to 118, and one AND gate 119.

The comparator 111 has a + terminal thereof applied with a reference voltage Vref2 which is lower than the source voltage Vdd of the H bridge circuit 11 by a predetermined voltage and lower than the source voltage of the source transistor 2 when the source transistor 2 is ON, and has a − terminal thereof applied with the voltage of the connection point between the source transistor 2 and the sink transistor 4. As a result, the output of the comparator 111 becomes L level when the source transistor 2 is turned ON.

The comparator 112 has a + terminal thereof applied with the reference voltage Vref2, and has a − terminal thereof applied with the voltage of the connection point between the source transistor 1 and the sink transistor 3. The operation of the comparator 112 is similar to that of the comparator 111.

A comparator 113 has a − terminal thereof applied with a reference voltage Vref3 which is higher than the ground voltage of the H bridge circuit 11 by a predetermined voltage and higher than the drain voltage of the sink transistor 4 when the sink transistor 4 is ON, and has a + terminal thereof applied with the voltage of the connection point between the source transistor 2 and the sink transistor 4 is applied to the + terminal of the comparator 113. As a result, the output of the comparator 113 becomes L level when the sink transistor 4 is turned ON.

The comparator 114 has a − terminal thereof applied with the reference voltage Vref3, and has a + terminal thereof applied with the voltage of the connection point between the source transistor 1 and the sink transistor 3. The operation of the comparator 114 is similar to that of the comparator 113.

The NAND gates 115 to 118 perform NAND operations using drive signals output from the current passage control circuit 120 and outputs of the comparators 111 to 114. The AND gate 119 performs an AND operation on outputs of the NAND gates 115 to 118, and outputs a result as the signal S1. In other words, when the overcurrent state occurs, any one of the outputs of the NAND gates 115 to 118 becomes L level. Accordingly, in this case, the AND gate 119 outputs the L level signal S1 representing that the overcurrent state is detected.

The overcurrent state detection circuit 110 may be provided with a resistor between the H bridge circuit 11 and a grounding point, in addition to the embodiment described above, and detect as the overcurrent state a state when the level of the voltage across the two terminals of the resistor exceeds a threshold voltage.

In a case where the overcurrent state is not detected, the current passage control circuit 120 performs a complimentary ON/OFF control of the transistors 1 to 4, to perform current passage control for passing drive current through the motor coil 5 to drive the motor to be rotated.

When the signal S1 becomes L level, the first monitor circuit 130 monitors whether or not the L level continues for a "first period." In other words, in a case where the signal S1 is instantaneously changed to L level from H level and quickly returns to H level, it is not desirable to stop the ON/OFF control of the transistors 1 to 4 for driving the motor to be rotated based on the L level signal S1. Therefore, when the current passage control circuit 120 monitors the signal S1 to observe that the signal S1 have continued to be at L level for the first period, the current passage control circuit 120 stops the ON/OFF control of the transistors 1 to 4 for driving the motor to be rotated, to be turned off all of the transistors 1 to 4.

The first monitor circuit 130 according to an embodiment of the present invention is realized by a counter made up of four D flip-flops (hereinafter referred to as "DFF") 131 to 134. The number of DFFs is not limited to four, but is set to a number according to the length of the first period. In each of the DFFs 131 to 134, a D terminal and a /Q terminal are connected; a clock signal CLK is input to a C terminal of the DFF 131 of the initial stage; and the outputs of the /Q terminals of the DFFs 131 to 133 are input to the C terminals of the DFFs 132 to 134 of the next stages. Also, the signal S1 is input to R terminals of the DFFs 131 to 134 via a NOR gate 141.

For example, when the signal S1 is at H level (when the overcurrent state is not detected), the DFFs 131 to 134 are reset by the L level output of the NOR gate 141 (when the output of a Q terminal of an RS flip-flop 142 is at L level due to an L level initial reset signal S11), and the signal S2 that is the output of the /Q terminal of the DFF 134 of the final stage, is maintained at H level. On the other hand, when the signal S1 is changed to L level (when the overcurrent state is detected), the reset of the DFFs 131 to 134 is released by the H level output of the NOR gate 141 (when the output of the Q terminal of the RS flip-flop 142 is at L level due to the L level initial reset signal S11), and the change of the /Q terminal of the DFF 131 of the initial stage is sequentially input to the C terminals of the DFFs 132 to 134 of the next stages on every rising edge of the clock signal CLK. When the signal S1 continues to be at L level for the first period, the signal S2 changes from H level to L level. At this time, the motor drive circuit 100 determines that the first period set by the first monitor circuit 130 has elapsed since overcurrent detection by the overcurrent state detection circuit 110.

When the signal S1 is changed from L level to H level during the first period, the DFFs 131 to 134 are reset, so that the signal S2 continues to be at H level. Therefore, when the signal S2 changes from H level to L level, it is found that the overcurrent state was detected by the overcurrent state detection circuit 110 (the signal S1 is at L level) and the first period set by the first monitor circuit 130 has elapsed.

When the signal S2 output from the first monitor circuit 130 is changed to L level, the first control circuit 140 performs control such that the current passage control circuit 120 stops the ON/OFF control of the transistors 1 to 4. Also, the first control circuit 140 performs control such that the current passage control circuit 120 stores in a register 125 the levels of gate drive signals of the transistors 1 to 4 at the time when the signal S2 has become at L level. Further, when the signal S2 is changed to L level, the first control circuit 140 performs control such that the discharge transistor 18 of the mask period setting circuit 15 is turned off and the capacitor 6 starts being charged. Furthermore, simultaneously with the start of charging the capacitor 6, the first control circuit 140 performs control such that all of the transistors 1 to 4 are turned off. In other words, the first control circuit 140 performs such control as to turn off all of the transistors 1 to 4 and stops the passage of current through the H bridge circuit 11 during the mask period set as the elapsed charging period for the charging voltage of the capacitor 6 at the predetermined voltage (0 level or initial level) to reach (exceed) the reference voltage Vref1 with the start of the charging of the capacitor 6.

The first control circuit 140 according to an embodiment of the present invention is mainly made up of the NOR gate 141, the RS flip-flop 142 having negative logic for the reset input and the set input, a NAND gate 143, and an inverter 144.

The signal S1 output from the overcurrent state detection circuit 110 and the output of the Q terminal of the RS flip-flop 142 are input to the NOR gate 141. In other words, when the signal S1 is changed to H level indicating that the overcurrent state is not detected (in a case where the output of the Q terminal of the RS flip-flop 142 is ignored), the NOR gate 141 outputs L level to reset the DFFs 131 to 134 making up the first monitor circuit 130. On the other hand, when the signal S1 is changed to L level indicating that the overcurrent state is detected (in a case where the output of the Q terminal of the RS flip-flop 142 is ignored), the NOR gate 141 outputs H level to release the reset of the DFFs 131 to 134.

After the reset of the DFFs 131 to 134 is released, when the signal S2 output from the /Q terminal of the DFF 134 of the final stage is changed from H level to L level (when the first period has elapsed), the signal S2 is input to a /S terminal of the RS flip-flop 142, and therefore, the output of the Q terminal of the RS flip-flop 142, which is input to the NOR gate 141, is changed from L level to H level. Therefore, after the reset of the DFFs 131 to 134 is released, the NOR gate 141 again outputs L level to reset the DFFs 131 to 134. In other words, when the overcurrent state is detected by the overcurrent state detection circuit 110 and the first period set by the first monitor circuit 130 has elapsed, the signal S2 has an L level one-shot waveform.

The RS flip-flop 142 has the /S terminal thereof that the signal S2 is input to, and a /R terminal thereof that the initial reset signal S11 is input to via an AND gate 163. The initial reset signal S11 is a signal that becomes L level at the time of the initial reset and is changed to H level thereafter. Accordingly, the RS flip-flop 142 becomes in a reset state when the L level initial reset signal S11 is input to the /R terminal via the AND gate 163 (when a signal S8 is at H level), and thereafter, continues to output an H level signal S3 from the /Q terminal until becoming in a set state. Also, the RS flip-flop 142 becomes in a set state when an L level signal S2 output from the first monitor circuit 130 is input to the /S terminal, and thereafter, continues to output an L level signal S3 from the /Q terminal until becoming in the reset state.

Upon receiving the L level signal S3 output from the RS flip-flop 142, the current passage control circuit 120 stops the ON/OFF control of the transistors 1 to 4, stores the ON/OFF state of the transistors 1 to 4 in the register 125, and then turn off all of the transistors 1 to 4. Specifically, when stopping the ON/OFF control of the transistors 1 to 4, the logic levels (ON is 1 and OFF is 0) of the gate drive signals for turning on and off the transistors 1 to 4 are stored in the register 125 as the above ON/OFF state. Hereinafter, the description of the ON/OFF state also indicates the logic levels of the gate drive signals of all of the transistors 1 to 4.

When a signal S9 is at H level, the NAND gate 143 outputs a signal S4 obtained by inverting the output of the Q terminal the RS flip-flop 142, to the gate electrode of the discharge transistor 18 of the mask period setting circuit 15. In other words, when the overcurrent state is not detected, or when the first period has not elapsed even though the overcurrent state is detected (when the signal S2 is at H level), the capacitor 6 is discharged due to an H level signal S4. Also, when the overcurrent state is detected and the first period has elapsed (when the signal S2 has the L level one-shot waveform), the capacitor 6 is charged due to an L level signal S4.

The inverter 144 inverts the signal S3 and performs an output for controlling the overcurrent protection circuit 150.

When the overcurrent state is detected and the first period has elapsed, the overcurrent protection circuit 150, based on the output of the inverter 144 included in the first control circuit 140, performs control for the current passage control circuit 120 such that all of the transistors 1 to 4 are turned off. Also simultaneously, the mask period setting circuit 15 starts charging the capacitor 6 in response to the L level signal S4 output from the first control circuit 140. Therefore, the overcurrent protection circuit 150 turns off all of the transistors 1 to 4, and then, when the mask period set as the charging period has elapsed, during which the charging voltage of the capacitor 6 is increased from the predetermined voltage to reach the reference voltage Vref1, the overcurrent protection circuit 150 performs control so as to restore the ON/OFF state of the transistors 1 to 4 stored in the register 125.

The overcurrent protection circuit 150 according to an embodiment of the present invention is realized mainly by a NAND gate 151 and an AND gate 154.

The output obtained by inverting the signal S3 from the inverter 144 and a signal S10 output from the comparator 16 are input to the NAND gate 151. In other words, when the overcurrent state is detected and the first period has elapsed, an L level signal S5 for turning off the transistors 1 to 4 is output to the current passage control circuit 120. Subsequently, when the charging voltage of the capacitor 6 reaches the reference voltage Vref1 and the logic level of the signal S10 output from the comparator 16 is changed from H level to L level, an H level signal S5 is output for turning on the transistors 1 to 4. At this time, the current passage control circuit 120 reads the ON/OFF state of the transistors 1 to 4 (the logic levels of the gate drive signals at the time of the overcurrent detection) stored in the register 125, to restore the ON/OFF state of the transistors 1 to 4 to the above ON/OFF state thereof that is read.

After the mask period has elapsed and the transistors 1 to 4 are restored to the ON/OFF state stored in the register 125, and then the second monitor circuit 170 sets a "second period" for guaranteeing that the outputs of the transistors 1 to 4 can be stably obtained.

The second monitor circuit 170 according to an embodiment of the present invention is realized by two DFFs 171 and 172. A Q terminal of the DFF 171 is connected with a D terminal of the DFF 172, and the clock signal CLK is input to each C terminal thereof. Also, a signal S6 output from an AND gate 153 is input to the D terminal of the DFF 171, and is inverted to be input to each R terminal of the DFFs 171 and 172.

Here, the signal S3 output from the RS flip-flop 142 and the signal S10 output from the comparator 16 are input to a NOR gate 152. Also, the output of the NOR gate 152 and the signal S9 output from an RS flip-flop 162 are input to the AND gate 153. Therefore, the signal S6 output from the AND gate 153 is changed from L level to H level after the mask period has elapsed. When the signal S6 is at H level, the DFFs 171 and 172 is in a state where the reset is released, and the output, which is changed from H level to L level, of the Q terminal of the DFF 171 of the initial stage is input to the D terminal of the DFF 172 of the next stage on each rising edge of the clock signal CLK. Furthermore, after the signal S6 is changed from L level to H level, when a signal S7 output from a /Q terminal of the DFF 172 is changed from H level to L level, the second period has elapsed.

After the second period has elapsed, even though the signal S1 is at H level indicating that the overcurrent state is not detected, the signal S1 may be at H level instantaneously. Therefore, the third monitor circuit 180 monitors whether or not the signal S1 continues to be at H level for a "third period" after the second period has elapsed.

The third monitor circuit 180 according to an embodiment of the present invention is realized by two DFFs 181 and 182. A Q terminal of the DFF 181 is connected with a D terminal of the DFF 181, and the clock signal CLK is input to each C terminal thereof. Also, the signal S6 is inverted to be input to each R terminal of the DFFs 181 and 182, and the Q terminal of the DFF 172 included in the second monitor circuit 170 is connected to the D terminal of the DFF 181. Here, if the overcurrent state is not detected and the signal S1 is at H level, then the signal S6 is also at H level and the reset of the DFFs 181 and 182 continues to be released. Therefore, after the second period has elapsed, H level is input from the Q terminal of the DFF 172 to the D terminal of the DFF 181, and when an L level signal S8 is output from the /Q terminal of the DFF 182, the signal S1 has continued to be at H level for the third period.

After the second period has elapsed, in the case where overcurrent is flowing and the signal S1 is at L level, the second control circuit 160 determines that the current passage control circuit 120 performs an overcurrent protection control so as to turn off all of the transistors 1 to 4. On the other hand, in the case where the overcurrent is not flowing, the signal S1 is at H level, and the signal S1 has continued to be at H level for the third period, it is determined that the overcurrent protection control is not performed and the ON/OFF control by the current passage control circuit 120 is restarted from the ON/OFF state stored in the register 125.

The second control circuit 160 according to an embodiment of the present invention is realized mainly by an OR gate 161, the RS flip-flop 162, and the AND gate 163. The signal S7 output from the second monitor circuit 170 and the signal S1 output from the overcurrent state detection circuit 110 are input to the OR gate 161. After the mask period has elapsed, when the second period has further elapsed, the signal S7 becomes L level. In other words, after the mask period has elapsed and until the second period has elapsed, the output of the OR gate 161 is fixed at H level due to the H level signal S7 regardless of the output of the signal S1. After the second period has elapsed, when the signal S7 becomes L level, the output of the OR gate 161 becomes an output corresponding to the logic level of the signal S1.

RS flip-flop 162 has a /S terminal thereof that the output of the OR gate 161 is input to; and a /R terminal thereof that the initial reset signal S11 is input to. Therefore, when the second period has elapsed and the signal S7 is changed to the L level, and when the signal S1 is at H level, the RS flip-flop 162 outputs an L level signal S9.

The initial reset signal S11 and the signal S8 output from the third monitor circuit 180 are input to the AND gate 163. In other words, the output of the AND gate 163 is changed to H level when the third period has elapsed and the L level signal S8 is output. Also, H level output from the AND gate 163 is input to a /R terminal of the RS flip-flop 142. As a result, the signal S3 becomes H level, and the ON/OFF control of the transistors 1 to 4 that had been stopped is restarted.

For the second control circuit 160, the overcurrent protection circuit 150 further includes the NOR gate 152 and the AND gate 153 in addition to the NAND gate 151 and the AND gate 154 described above.

The signal S3 output from the RS flip-flop 142 and the signal S10 output from the comparator 16 are input to the NOR gate 152. In other words, the NOR gate 152 outputs L level when the overcurrent state is not detected, and outputs L level until the mask period has elapsed when the overcurrent state is detected, and outputs H level after the mask period has elapsed.

The output of the NOR gate 152 and the signal S9 output from the RS flip-flop 162 are input to the AND gate 153. In other words, the signal S6 output from the AND gate 153 becomes H level after the mask period has elapsed, becomes L level when the signal S1 is at L level after the second period has elapsed, and becomes H level until the third period has elapsed when the signal S1 is at H level after the second period has elapsed.

Figure 2:
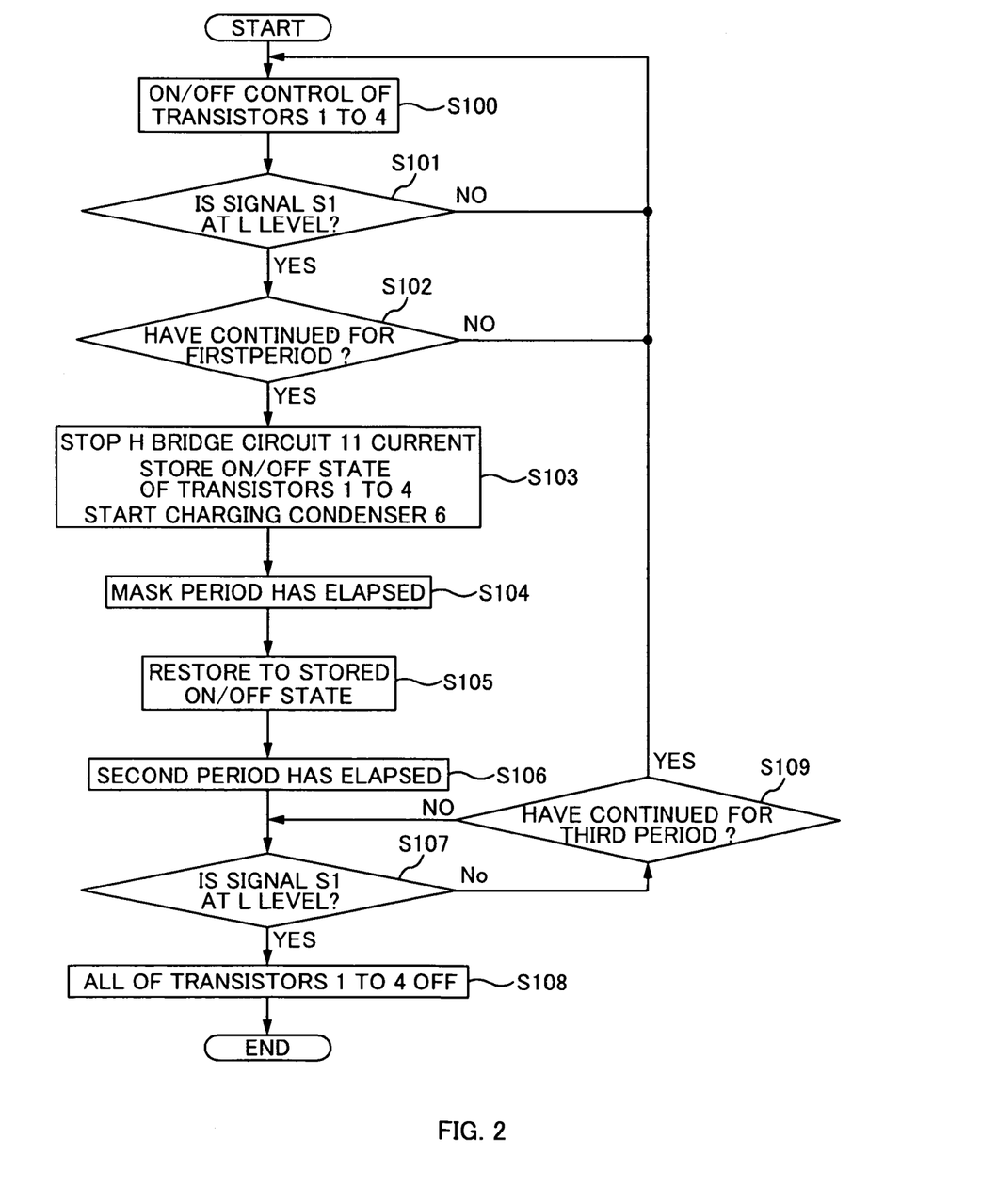
FIG. 2 is a flowchart for describing operations of a motor drive circuit according to an embodiment of the present invention.
Figure 3:
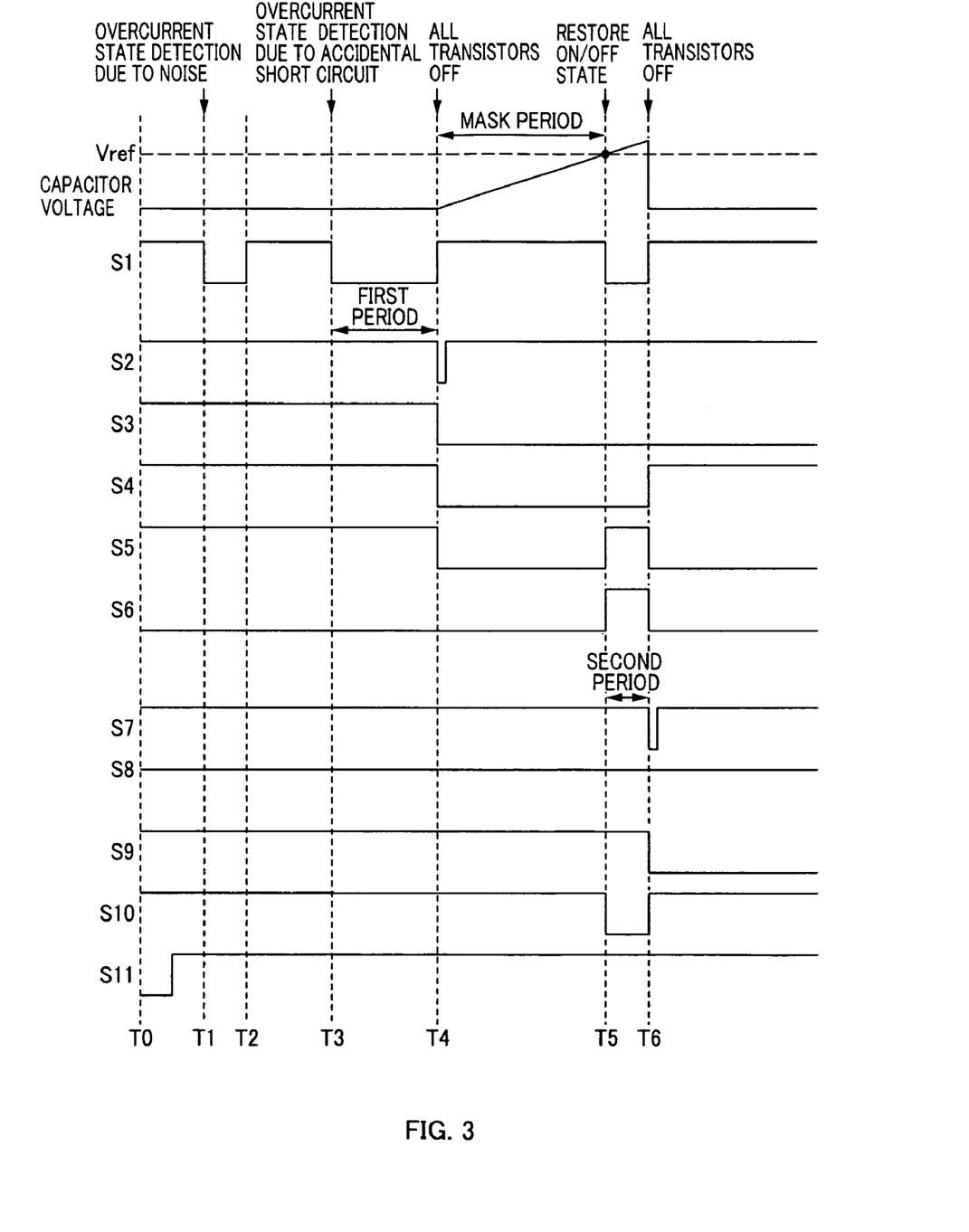
FIG. 3 is a waveform diagram of main signals of a motor drive circuit according to an embodiment of the present invention.
Figure 4:
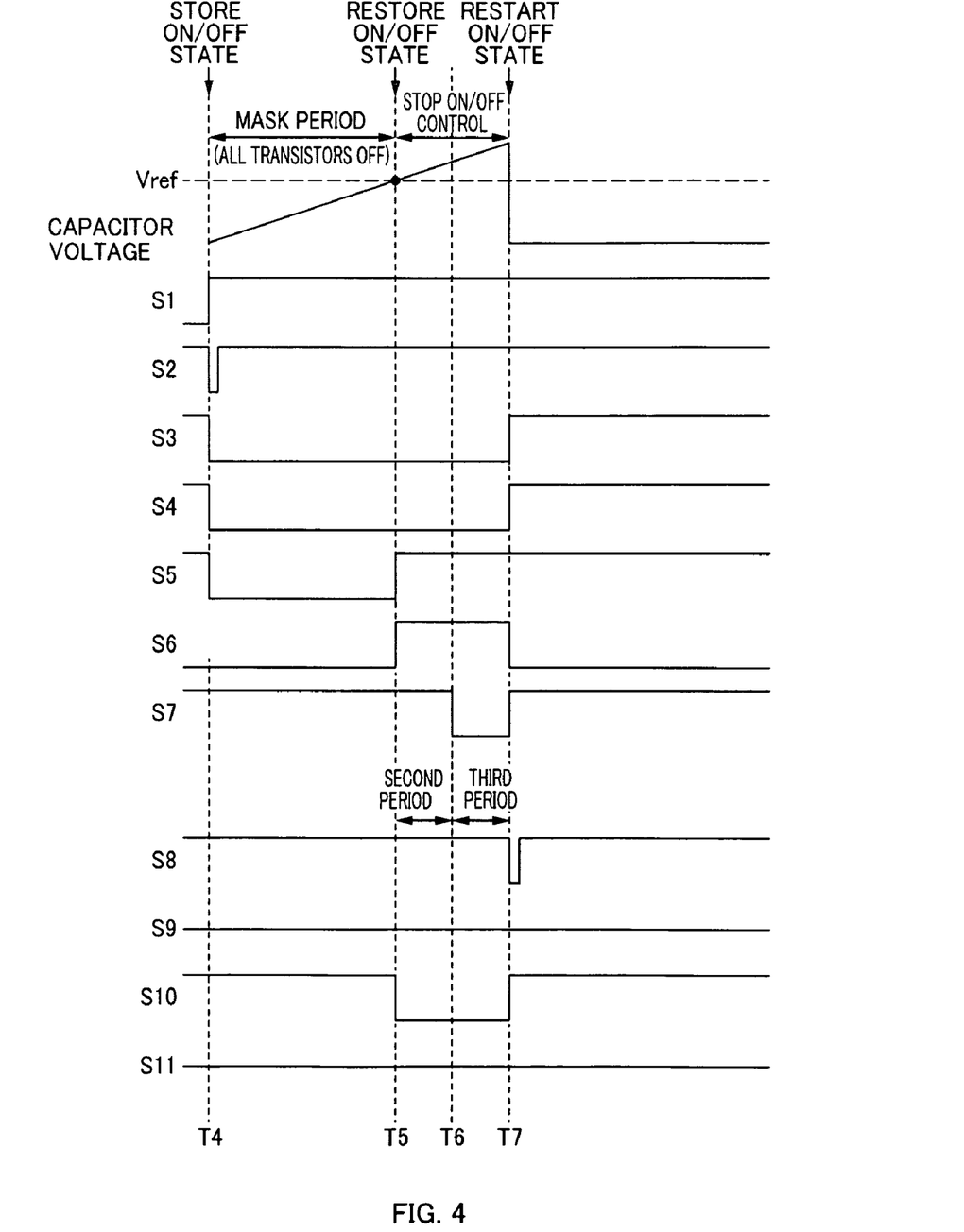
FIG. 4 is another waveform diagram for main signals of a motor drive circuit according to an embodiment of the present invention.

The operations of the motor drive circuit 100 illustrated in FIG. 1 will be described with reference to waveform diagrams of main signals of the motor drive circuit 100 illustrated in FIG. 3 and FIG. 4 using a flowchart illustrated in FIG. 2.

First, a case is assumed where neither noise nor an accidental short circuit occurs. In this case, the signal S1 output from the overcurrent state detection circuit 110 is at H level, and the current passage control circuit 120 performs the ON/OFF control of the transistors 1 to 4 for rotationally driving the motor (S100). For example, this is such a state as to be illustrated at time T0 in FIG. 3.

Next, a case is assumed where noise or an accidental short circuit occurs, an overcurrent passes through the transistors 1 to 4, and the signal S1 output from the overcurrent state detection circuit 110 is at L level (S101: YES). In this case, the first monitor circuit 130 monitors whether or not the signal S1 continues to be at L level for the first period (S102). For example, this is such a state as to be illustrated at time T1 and time T3 in FIG. 3.

Here, a case is assumed where the signal S1 does not continue to be at L level for the first period, and the signal S2 output from the first monitor circuit 130 continues to be at H level (S102: NO). For example, this is a state from the time T1 to time T2 in FIG. 3. In this case, it is determined that the overcurrent state detected by the overcurrent state detection circuit 110 is caused by noise. The ON/OFF control of the transistors 1 to 4 for rotationally driving the motor continues to be performed (S100).

On the other hand, a case is assumed where the signal S1 continues to be L level for the first period, and the signal S2 output from the first monitor circuit 130 is changed from H level to L level (S102: YES). For example, this is a state from the time T3 to a time T4 in FIG. 3. In this case, it is determined that the overcurrent state detected by the overcurrent state detection circuit 110 is caused not by noise but by an accidental short circuit. The first control circuit 140 stores in the register 125 the ON/OFF state of the transistors 1 to 4 at the time when the first period has elapsed, starts charging the capacitor 6, and stops passing current through the H bridge circuit 11 by turning all of the transistors 1 to 4, simultaneously (S103). For example, this is such a state as to be illustrated at the time T4 in FIG. 3.

Next, after the capacitor 6 starts being charged, when the charging voltage of the capacitor 6 is increased from the predetermined voltage to reach the reference voltage Vref1 and the mask period elapses (S104), the first control circuit 140 restores the ON/OFF state of the transistors 1 to 4 stored in the register 125 (S105). For example, this is such a state as to be illustrated at time T5 in FIG. 3 and FIG. 4.

Next, a case is assumed where after the mask period has elapsed, the second period set by the second monitor circuit 170 has further elapsed (S106). For example, this is a state from the time T5 to time T6 in FIG. 3 and FIG. 4.

Here, it is determined to perform the overcurrent protection control so as to turn off all of the transistors 1 to 4 (S108) in the case where the second period has elapsed, the overcurrent passes through the transistors 1 to 4, and the signal S1 output from the overcurrent state detection circuit 110 is at L level (S107: YES). For example, this is such a state as to be illustrated at the time T6 in FIG. 3.

On the other hand, when the accidental short circuit is resolved during the mask period and the signal S1 output from the overcurrent state detection circuit 110 is at H level at the time when the second period has elapsed (S107: NO), the third monitor circuit 180 monitors whether or not the signal S1 further continues to be H level for the third period (S109). For example, this is such a state as to be illustrated at the time T6 in FIG. 4.

Here, in a case where the H level signal S1 at the time when the second period has elapsed is monitored and observed to have continued for the third period (S109: YES), it is determined that the overcurrent protection control is not to performed, and the ON/OFF control of the transistors 1 to 4 is restarted from the ON/OFF state stored in the register 125. For example, this is such a state as to be illustrated from the time T6 to time T7 in FIG. 4.

On the other hand, in a case where the H level signal S1 at the time when the second period has elapsed is monitored and observed not to have continued for the third period (S109: NO), the logic level of the signal S1 is checked again (S107).

As described above, during the period from the time when the overcurrent state is detected until the time when the mask period has elapsed, all of the transistors 1 to 4 in the H bridge circuit 11 are turned off, to stop passing current through the H bridge circuit 11. In other words, according to a conventional overcurrent protection method, the overcurrent protection is not performed until the detection of the overcurrent state having continued for the mask period so as to prevent an erroneous detection due to noise; whereas in an embodiment of the present invention, all of the transistors 1 to 4 are turned off once even during the mask period. Accordingly, even in a case where the selection of the capacitor 6 is inappropriate, or an inappropriately long period is set as the mask period for the overcurrent protection, an object to be protected from the overcurrent can be reliably protected.

Also, since the first monitor circuit 130 monitors whether or not the overcurrent state has continued for the first period, it can be determined whether the overcurrent state detected by the overcurrent state detection circuit 110 is caused by noise or caused by an accidental short circuit. Accordingly, even if the overcurrent state is detected which is caused by noise, it is avoided to stop passing current through the H bridge circuit 11 during the mask period, and therefore, a decline of the operating rate of the motor can be restrained.

Further, when stopping the passage of the current through the H bridge circuit 11 during the mask period, the ON/OFF state of the transistors 1 to 4 at the time when the first period has elapsed is stored in the register 125. Accordingly, after t the mask period has elapsed, the transistors 1 to 4 can be smoothly restored to the ON/OFF state at the time when the first period has elapsed.

Furthermore, in a case where the overcurrent state caused by the accidental short has continued also for the mask period, if the transistors 1 to 4 that were turned off at the time when the mask period has elapsed are restored to the ON/OFF state at the time of the detection of the overcurrent, since the accidental short circuit is not resolved at all, the overcurrent state occurs again. Therefore, such a configuration is made as to monitor whether or not the overcurrent state has continued to be detected for the second period after the elapse of the mask period.

Specifically, determination is made by the logic level of the signal S1 generated when the ON/OFF state of the transistors 1 to 4 that were turned off is restored. Also, at this time, the second period set by the second monitor circuit 170 is provided as a period from the time after the transistors 1 to 4 are restored to the ON/OFF state at the time when the first period has elapsed until the time when the logic level of the signal S1 is determined. As a result, the logic level of the signal S1 is not determined during the second period in which the outputs of the transistors 1 to 4 are unstable immediately after restoring the transistors 1 to 4 to the ON/OFF state at the time when the first period has elapsed, and therefore, it is possible to perform the detection of the overcurrent state more reliably.

Additionally, in a case where the signal S1 is at H level even after the elapse of the second period, it is determined not to perform such an overcurrent protection control as to turn off all of the transistors 1 to 4, so that the ON/OFF control is restarted of the transistors 1 to 4 by the current passage control circuit 120. Specifically, in a case where the signal S1 has continued to be at H level for the third period set by the third monitor circuit 180, the ON/OFF control of the transistors 1 to 4 is restarted. As a result, in a case where the period during which the signal S1 is at H level is such an instantaneous period as to be less than the third period, an erroneous restart is avoided of the ON/OFF control of the transistors 1 to 4, and therefore, it is possible to perform the detection of the overcurrent state more reliably.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A motor drive circuit comprising:
    a current passage control circuit configured to perform ON/OFF control of a drive transistor connected to a motor coil to pass current through the motor coil;
    an overcurrent state detection circuit configured to detect whether or not current passing through the drive transistor is in an overcurrent state where the current exceeds a predetermined threshold value;
    a charging and discharging circuit configured to start charging a capacitor in response to detecting the overcurrent state by the overcurrent state detection circuit and subsequently discharge the capacitor in response to not detecting the overcurrent state; and
    an overcurrent protection control circuit configured to
    stop the ON/OFF control of the drive transistor performed by the current passage control circuit to turn off the drive transistor, for an elapsed charging period for a charging voltage of the capacitor at a predetermined voltage to exceed a threshold voltage, and
    determine whether or not to perform such an overcurrent protection control as to turn off the drive transistor by detection of the overcurrent state, after the charging period has elapsed.

2. The motor drive circuit according to claim 1, comprising:
    a first monitor circuit configured to monitor whether or not the overcurrent state detected by the overcurrent state detection circuit has continued for a first period, wherein
    the overcurrent protection control circuit stops the ON/OFF control of the drive transistor performed by the current passage control circuit to turn off the drive transistor for the elapsed charging period, in response to monitoring the overcurrent state to observe that the overcurrent state has continued for the first period in the first monitor circuit.

3. The motor drive circuit according to claim 2, wherein the overcurrent protection control circuit stores an ON/OFF state of the drive transistor at a time when the overcurrent state is monitored and observed to have continued for the first period in the first monitor circuit, and restores the drive transistor to the stored ON/OFF state from a state where the drive transistor is turned off, and then determines whether or not to perform the overcurrent protection control, when the charging period has elapsed.

4. The motor drive circuit according to claim 3, comprising:

a second monitor circuit configured to monitor whether or not the overcurrent state detected by the overcurrent state detection circuit has continued for a second period after the drive transistor has been restored to the stored ON/OFF state, wherein the overcurrent protection control circuit determines to perform the overcurrent protection control when the overcurrent state is monitored and observed to have continued for the second period in the second monitor circuit.

5. The motor drive circuit according to claim 4, comprising:

a third monitor circuit configured to monitor whether or not the overcurrent state detected by the overcurrent state detection circuit has continued for a third period after the second period has elapsed, wherein the overcurrent protection control circuit determines not to perform the overcurrent protection control, and restarts the ON/OFF control of the drive transistor performed by the current passage control circuit from a restored ON/OFF state, when the overcurrent state is monitored and observed not to have continued for the third period.

* * * * *